(12) United States Patent
Yhann (10) Patent No.: US 8,044,955 B1
(45) Date of Patent: Oct. 25, 2011

(54) DYNAMIC TESSELLATION SPREADING FOR RESOLUTION-INDEPENDENT GPU ANTI-ALIASING AND RENDERING

(75) Inventor: Stephan R. Yhann, Renton, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1089 days.

(21) Appl. No.: 11/848,943

(22) Filed: Aug. 31, 2007

(51) Int. Cl.
*G06T 15/30* (2011.01)

(52) U.S. Cl. .................... 345/423; 345/419; 345/420

(58) Field of Classification Search .................... None
See application file for complete search history.

(56) References Cited

U.S. PATENT DOCUMENTS

| | | | |
|---|---|---|---|
| 6,295,072 B1 | 9/2001 | Pon et al. | |
| 6,954,211 B2 | 10/2005 | Michail et al. | |
| 6,967,663 B1 * | 11/2005 | Bastos et al. | 345/613 |
| 7,050,067 B2 | 5/2006 | Raubacher et al. | |
| 7,116,327 B2 | 10/2006 | Katka | |
| 7,127,525 B2 | 10/2006 | Coleman et al. | |
| 7,239,319 B2 | 7/2007 | Loop | |
| 2007/0097123 A1 | 5/2007 | Loop et al. | |

FOREIGN PATENT DOCUMENTS

EP 1630745 1/2006

OTHER PUBLICATIONS

Bala R. Vatti, "A Generic Solution to Polygon Clipping," Communications of the ACM, Jul. 1992, pp. 56-63, vol. 35, Issue 7, ACM Press, New York, NY.
Eric Chan, "Fast Antialiasing Using Prefiltered Lines on Graphics Hardware," Feb. 2004, http://people.csail.mit.edu/ericchan/articles/prefilter/.
Charles Loop and Jim Blinn, "Resolution Independent Curve Rendering Using Programmable Graphics Hardware," ACM SIGGRAPH 2005, 2005, pp. 1000-1009, ACM Press, New York, NY.
John D. Hobby, "Rasterization of Nonparametric Curves," ACM Transactions on Graphics, Jul. 1990, pp. 262-277, vol. 9, Issue 3, ACM Press, New York, NY.
Fiaz Hussain and Michael L.V. Pitteway, "Rasterizing the Outlines of Fonts," Electronic Publishing, Sep. 1993, pp. 171-181, vol. 6, No. 3.
Zheng Qin, Michael D. McCool, and Craig S. Kaplan, "Real-Time Texture-Mapped Vector Glyphs," Symposium on Interactive 3D Graphics, 2006, pp. 125-132, ACM Press, New York, NY.
Seth J. Teller and Carlo H. Sequin, "Modeling Implicit Quadrics and Free-form Surfaces With Trimmed Rational Quadratic Bezier Patches," Technical Report No. UCB/CSD-90-577, Jun. 1990, University of California—Berkeley.

(Continued)

*Primary Examiner* — Said Broome
(74) *Attorney, Agent, or Firm* — Robert C. Kowert; Meyertons, Hood, Kivlin, Kowert & Goetzel, P.C.

(57) ABSTRACT

A method, system, and computer-readable storage medium are disclosed for dynamic tessellation spreading. In one embodiment, an offset vector may be determined for each of a plurality of vertices, wherein the plurality of vertices define an original path. The plurality of vertices and the plurality of offset vectors may be sent to a graphics processing unit (GPU). A spread path may be generated in the GPU, wherein generating the spread path comprises adjusting each vertex by the respective offset vector in a coordinate space of a target device. The spread path may be rendered to the target device using the GPU.

22 Claims, 7 Drawing Sheets

OTHER PUBLICATIONS

Raimund Seidel, "A Simple and Fast Incremental Randomized Algorithm for Computing Trapezoidal Decompositions and for Triangulating Polygons," Computational Geometry: Theory and Applications, Jul. 1991, pp. 51-64, vol. 1, No. 1, Elsevier Science Publishers B.V., Amsterdam.

U.S. Appl. No. 11/874,600, filed Oct. 18, 2007.
U.S. Appl. No. 11/848,950, filed Aug. 31, 2007.
U.S. Appl. No. 11/848,948, filed Aug. 31, 2007.
U.S. Appl. No. 11/848,940, filed Aug. 31, 2007.

* cited by examiner

DYNAMIC TESSELLATION SPREADING FOR RESOLUTION-INDEPENDENT GPU ANTI-ALIASING AND RENDERING

BACKGROUND

1. Field of the Invention

The present invention is directed to computer systems; and more particularly, it is directed to utilization of graphics processors associated with computer systems for anti-aliasing operations.

2. Description of the Related Art

As the power and complexity of personal computer systems increase, graphics operations are increasingly being performed using dedicated graphics rendering devices referred to as graphics processing units (GPUs). As used herein, the terms "graphics processing unit" and "graphics processor" are used interchangeably. GPUs are often used in removable graphics cards that are coupled to a motherboard via a standardized bus (e.g., AGP or PCI Express). GPUs may also be used in game consoles and in integrated graphics solutions (e.g., for use in some portable computers and lower-cost desktop computers). Although GPUs vary in their capabilities, they may typically be used to perform such tasks as rendering of two-dimensional (2D) graphical data, rendering of three-dimensional (3D) graphical data, accelerated rendering of graphical user interface (GUI) display elements, and digital video playback. A GPU may implement one or more application programmer interfaces (APIs) that permit programmers to invoke the functionality of the GPU.

To reduce demands on central processing units (CPUs) of computer systems, GPUs may be tasked with performing operations that would otherwise contribute to the CPU load. Accordingly, modern GPUs are typically implemented with specialized features for efficient performance of common graphics operations. For example, a GPU often includes a plurality of execution channels that can be used simultaneously for highly parallel processing. A GPU may include various built-in and configurable structures for rendering digital images to an imaging device.

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, paths, polygons, Bézier curves, and text characters) may be based upon mathematical equations to represent parts of vector graphics data in digital images. The geometric objects may typically be located in two-dimensional or three-dimensional space. To render vector graphics on raster-based imaging devices (e.g., most display devices and printers), the geometric objects are typically converted to raster graphics data in a process called rasterization.

The rasterization process may result in undesirable aliasing. Aliasing is typically defined as the introduction of artifacts resulting from a wide-bandwidth signal being sampled at an insufficiently high sampling rate. Visible "jaggies" in a rendered image are an example of aliasing. Typically, aliasing is most noticeable on objects with non-orthogonal edges. Anti-aliasing techniques may be used to reduce the effects of aliasing and provide a smoother appearance for those edges. A typical approach to anti-aliasing includes low-pass filtering of a signal (e.g., by the averaging or other smoothing of pixel data) to reduce its bandwidth and thereby reduce anti-aliasing artifacts. However, low-pass filtering a signal may result in the "spreading" of the signal. For example, if a sharp edge (e.g., a stair or step function) is low-pass filtered or otherwise smoothed, the sharp edge may "spread" to become a soft edge in which the transition from edge's low value to its high value is spread over more pixels. Thus, the smoothed object may cover a slightly larger area (in device pixels, e.g., expanding the area out by one or two device pixels) than the original un-smoothed object.

As noted above, one of the geometric elements often rendered using a GPU is a path. A path may be a closed contour, and a geometric shape may be defined as the region enclosed by a closed path. A path may include straight lines and/or curve segments. Typically, regions enclosed by paths are rendered on a GPU by tessellating the region enclosed by the path to produce a collection of covering triangles that are each rendered on the GPU to a target device. However, because device pixels of a target device are larger at lower resolutions than at higher resolutions, typical approaches to anti-aliasing may produce a device-dependent path which is larger at low resolutions and smaller (i.e., closer in size to the ideal size of the original path) at high resolutions.

This problem has been addressed in the past by making the area to be filtered large enough to include all of the pixels that would be filtered at the lowest resolution. However, this approach often has the disadvantage of including many extra pixels at higher resolutions. For example, a 1 pixel spread of the bound at 72 dpi maps to a 10 device pixel spread at 720 dpi when a fixed spread is used. Thus, this approach may significantly increase the number of pixels that are unnecessarily filtered, cause a performance penalty, and introduce possible quality issues (especially, for example, at tight corners). An alternative approach is to define smaller zoom ranges so that the spread is smaller at the higher resolutions in the range and so that there are fewer wasted pixels. However, this may require re-tessellation as the path shape changes, and the number of re-tessellations may be tied to the size of the zoom range over which the tessellations can be used. Because tessellation of a path may be computationally expensive, it is desirable to avoid re-tessellating paths.

GPUs typically render with a center scan rule, while some applications (e.g., those using the Adobe® Imaging Model) may use an overscan rule for rendering. Center scan rendering follows a rendering rule for coloring device pixels that assigns to a pixel the color at the point on the graphic object that maps to the pixel's center. Thus, a thin graphic element (e.g., a thin strokefill) may not color any pixels at low resolutions using a center scan rule. In contrast, overscan rendering follows a rendering rule for coloring device pixels that assigns to a pixel the color of a graphic object touching the pixel. Thus, a thin graphic element (e.g., a thin strokefill) will always color pixels, even at low resolutions, using an overscan rule. If a path has thin or narrow sections, these sections may fail to render with the center scan rule when the center of a pixel is not enclosed by the path. For example, a thin horizontal stroke may not render at all if its path does not include a device pixel center. The position of pixel centers, relative to the path, may change with resolution such that paths may appear and disappear as a page is zoomed. This undesirable phenomenon is referred to as thin element dropout.

SUMMARY

Various embodiments of systems, methods, and computer-readable storage media for dynamic tessellation spreading are disclosed. In one embodiment, performance gains in rendering may be achieved by creating a device-independent path that does not need to be re-tessellated whenever the resolution of the target imaging device changes. The target resolution may change, for example, when redisplaying a scene including the path after zooming into or out of the scene.

In one embodiment, an offset vector may be determined for each of a plurality of vertices, wherein the plurality of vertices define an original path. When the spread or offset for the path is determined, the path is not actually spread at that time. The position of the path's vertices remain unchanged, but an offset vector that would be added to a vertex to move it out in the spread direction is stored with each vertex. The path may be tessellated, and the plurality of vertices and offset vectors may be sent to the GPU. Each offset vector may be sent as a texture parameter associated with the respective vertex in the tessellation.

In one embodiment, a spread path may be generated in the GPU using the vertices and the offset vectors. Generating the spread path may comprise adjusting each vertex by the respective offset vector in a coordinate space of a target device. Adjusting each vertex by the respective offset vector in the coordinate space of the target device may comprise expanding the original path by a fixed distance in pixels (e.g., 1 to 2 pixels) of the target device. The spread path may then be rendered to the target device using the GPU. The spread path may be rendered using anti-aliasing techniques.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 1:
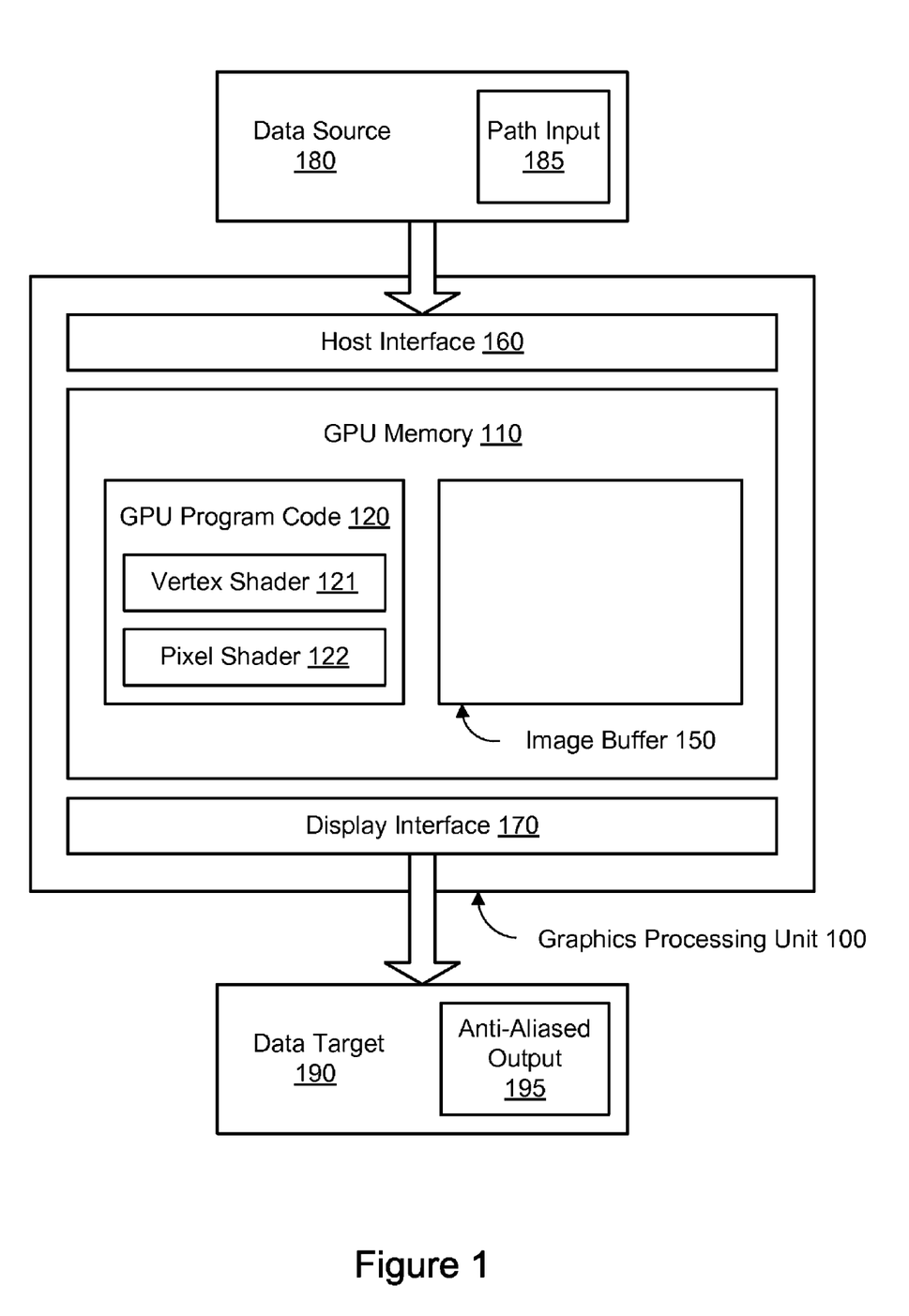
FIG. 1 is a block diagram illustrating one embodiment of a graphics processing unit (GPU) configured to perform anti-aliasing using dynamic tessellation spreading.
Figure 7:
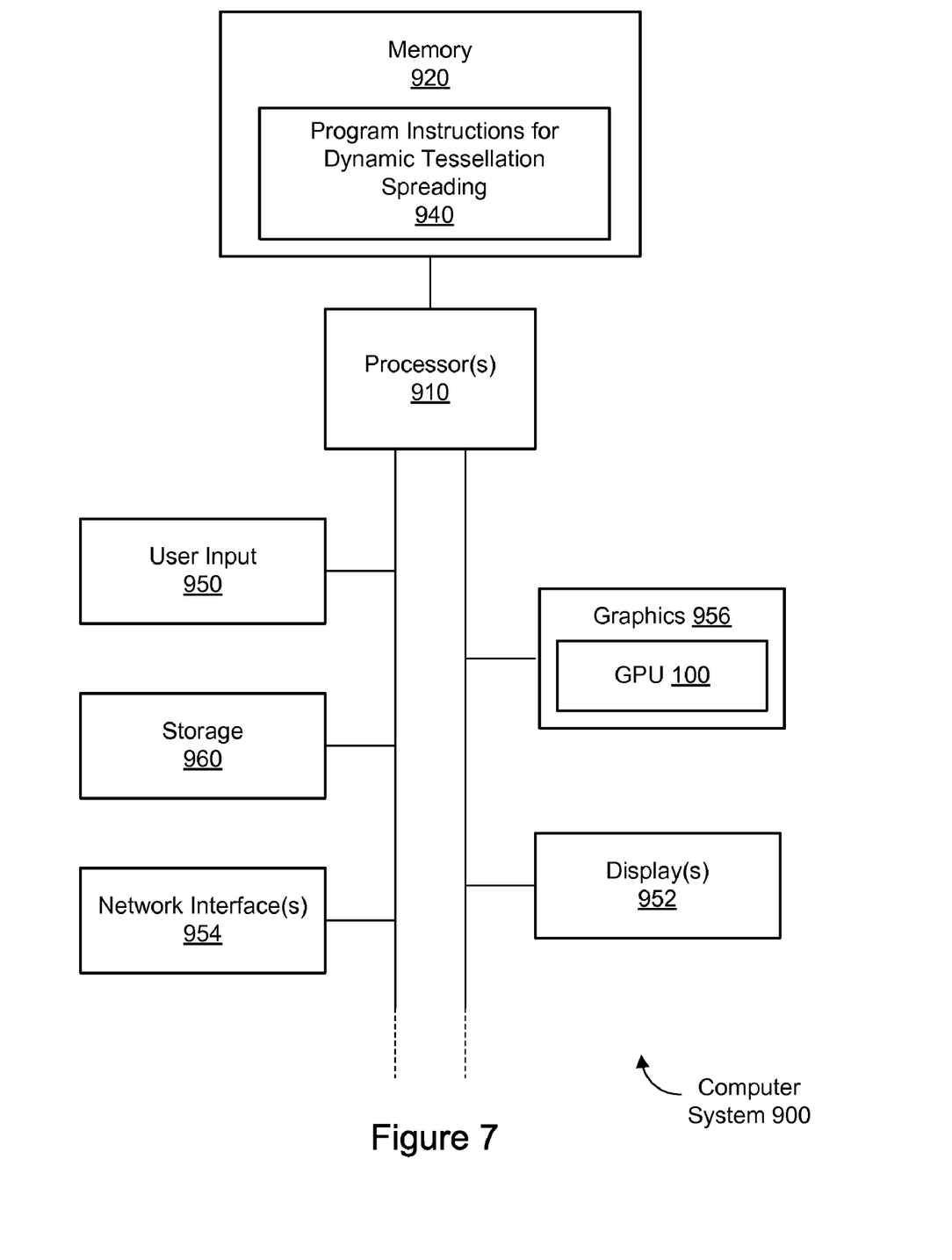
FIG. 7 is a block diagram illustrating constituent elements of a computer system that is configured to implement embodiments of the system and method for dynamic tessellation spreading.

Using embodiments of the systems and methods described herein, paths may be rendered in an anti-aliased manner using dynamic tessellation spreading on a graphics processing unit (GPU). FIG. 1 is a block diagram illustrating one embodiment of a GPU 100 configured to perform anti-aliasing using dynamic tessellation spreading. The GPU 100, also referred to herein as a graphics processor, may comprise a dedicated graphics rendering device associated with a computer system. An example of a suitable computer system 900 for use with a GPU is illustrated in FIG. 7. Turning back to FIG. 1, the GPU 100 may include numerous specialized components configured to optimize the speed of rendering graphics output. For example, the GPU 100 may include specialized components for rendering three-dimensional models, for applying textures to surfaces, etc. For the sake of illustration, however, only a limited selection of components is shown in the example GPU 100 of FIG. 1. It is contemplated that GPU architectures other than the example architecture of FIG. 1 may be suitable for implementing the techniques described herein. The GPU 100 may implement one or more application programmer interfaces (APIs) that permit programmers to invoke the functionality of the GPU. Suitable GPUs may be commercially available from vendors such as NVIDIA Corporation, ATI Technologies, and others.

The GPU 100 may include a host interface 160 configured to communicate with a data source 180 (e.g., a communications bus and/or processor(s) 910 of a host computer system 900, or the host system itself). For example, the data source 180 may provide input data (e.g., a scene comprising one or more geometric objects, one or more paths, etc.) and/or executable program code to the GPU 100. In some embodiments, the host interface 160 may permit the movement of data in both directions between the GPU 100 and the data source 180. The GPU 100 may also include a display interface 170 for providing output data to a data target 190. For example, the data target 190 may comprise a display device 952, and the GPU 100 (along with other graphics components and/or interfaces 956) may "drive" the display 952 by providing graphics data at a particular rate from a screen buffer (e.g., the image buffer 150).

In one embodiment, the GPU 100 may include internal memory 110. The GPU memory 110, also referred to herein as "video memory" or "VRAM," may comprise random-access memory (RAM) which is accessible to other GPU components. As will be described in greater detail below, the GPU memory 110 may be used in some embodiments to store various types of data and instructions such as input data, output data, intermediate data, program instructions for performing various tasks, etc. In one embodiment, the GPU 100 may also be configured to access memory 920 of a host computer system 900 via the host interface 160.

In one embodiment, program instructions 940 may be stored in the memory 920 of the host computer system 900 and executed by the host computer system 900 to generate anti-aliased output 195 based on path input 185. The path input 185 may include a scene comprising one or more paths. Each path may comprise a plurality of vertices. As will be described in greater detail below, each path intended to be rendered may undergo dynamic tessellation spreading prior to sending the path input 185 to the GPU 100.

In one embodiment, the GPU 100 may include GPU program code 120 that is executable by the GPU 100 to perform aspects of the techniques discussed herein. For example, the regions defined by the paths in the path input 185 may be rasterized to pixels during a rendering process including execution of the GPU program code 120 on the GPU 100. Elements of the GPU program code 120 may be provided to the GPU 100 by a host computer system (e.g., the data source 180) and/or native to the GPU 100. The GPU program code 120 may comprise a vertex shader 121 and/or a pixel shader 122. A vertex shader 121 comprises program instructions that are executable by the GPU 100 to determine properties (e.g., position) of a particular vertex. A vertex shader 121 may expect input such as uniform variables (e.g., constant values for each invocation of the vertex shader) and vertex attributes (e.g., per-vertex data). A pixel shader 122 comprises program instructions that are executable by the GPU 100 to determine properties (e.g., color) of a particular pixel. A pixel shader 122 may also be referred to as a fragment shader. A pixel shader 122 may expect input such as uniform variables (e.g., constant values for each invocation of the pixel shader) and pixel attributes (e.g., per-pixel data). In generating the anti-aliased output 195, both the vertex shader 121 and the pixel shader 122 may be executed at various points in the graphics pipeline.

The GPU memory 100 may comprise one or more buffers, and each buffer may comprise a two-dimensional array of pixel data (e.g., color values) and/or pixel metadata (e.g., depth values, stencil values, etc.). As illustrated in FIG. 1, for example, the GPU memory 110 may comprise an image buffer 150. The image buffer 150 may store intermediate or final pixel values generated in the rendering process. In one embodiment, the image buffer 150 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In one embodiment, the image buffer 150 may comprise a multi-sampling buffer usable for anti-aliasing.

The term "tessellation" may refer to a collection of non-overlapping triangles that cover a region (e.g., a region enclosed by a path). The term "tessellation" may also refer to the process of generating such a set of triangles given a set of geometric objects (e.g., paths) as input. In one embodiment, the paths in the path input 185 may be tessellated (i.e., reduced to triangles) prior to sending the path input 185 to the GPU 100. For example, the tessellation may occur through tessellation techniques performed on the data source 180. The computational expense required to tessellate a complex path may be significant.

In one embodiment, therefore, performance gains may be achieved by creating a device-independent path that does not need to be re-tessellated whenever the resolution of the target device 190 changes. The target resolution may change, for example, when redisplaying a scene including the path after zooming into or out of the scene. In one embodiment, the device-independent tessellated path may be generated by dynamically updating the "spread" of the original path. The spread of a path may include an extension of the path out along its entire boundary contour by a constant amount. The resulting path (referred to as the offset path) is similar to the path that would result from the union of filling and stroking the original path. The path tessellation may be dynamically spread in the GPU, thereby substantially removing the need to re-spread or re-tessellate the path as the view resolution changes. In one embodiment, thin element dropout may be minimized or eliminated using this technique.

Figure 2:
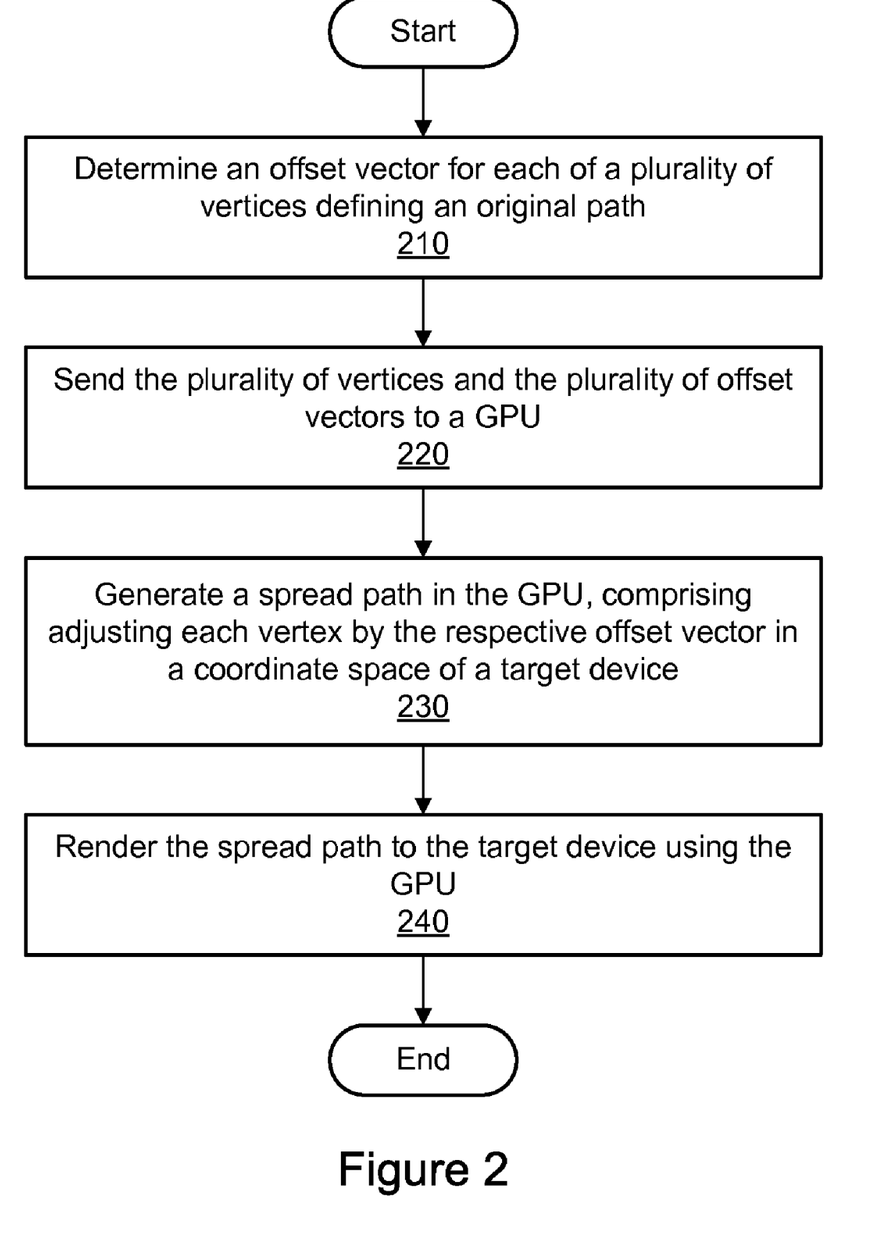
FIG. 2 is a flow diagram illustrating a method for dynamic tessellation spreading according to one embodiment.

FIG. 2 is a flow diagram illustrating a method for dynamic tessellation spreading according to one embodiment. As shown in block 210, an offset vector may be determined for each of a plurality of vertices, wherein the plurality of vertices define an original path. When the spread or offset for the path is determined, the path is not actually spread at that time. The position of the path's vertices remain unchanged, but an offset vector that would be added to a vertex to move it out in the spread direction is stored with each vertex. Each vector may comprise a direction and a magnitude. The stored offset vectors may be normalized so that they are unit directional vectors.

In one embodiment, any suitable technique may be used for calculating the offsets. Using one conventional algorithm, for example, the path may be divided into left and right points, with each left and right bound pair starting at a local minima on the path. The algorithm may process the path segments, starting at the local minima, one scanbeam at a time. A scanbeam is the region bounded by two horizontal lines passing through to adjacent vertices in a y-coordinate sorted vertex list. The offset vector may be computed at each path vertex so that the entire path is offset to create a new path. In one embodiment, the offset points and the path segments they generate may be tested for overlap or intersection with other path segments; if an intersection results between the offset paths, the original path may also be tested. If the original paths do not intersect, the offset may be reduced to one-half the distance between the original, un-spread paths. The offset may typically be computed at the lower end of the device resolution range so that offset paths that do not intersect at the low resolution are guaranteed not to intersect at higher resolutions. In one embodiment, the offset path segments are temporary and may expire when they go out of scope. However, the original path vertices and the offset vectors may be stored persistently.

In one embodiment, special handling may be applied to joints between segments that meet at acute angles requiring a miter. In these cases, the original vertex may be "split" into two vertices that share the same coordinates. However, the two new vertices may each have different offset vectors corresponding to the offsets to the two miter points generated.

As shown in block 220, the plurality of vertices and the plurality of offset vectors may be sent to the GPU 100. In one embodiment, each offset vector may be sent as a texture parameter associated with the respective vertex.

As shown in block 230, a spread path may be generated in the GPU 100. Generating the spread path may comprise adjusting each vertex by the respective offset vector in a coordinate space of a target device. In one embodiment, the vertices and/or offset vectors may be adjusted relative to a resolution of the target device. As will be described in greater detail below, adjusting each vertex by the respective offset vector in the coordinate space of the target device may comprise expanding the original path by a fixed distance in pixels of the target device.

As shown in block 240, the spread path may be rendered to the target device using the GPU 100. Rendering the spread path may comprise using conventional anti-aliasing techniques. For example, the spread path may be rendered to a multi-sampling buffer in the GPU (e.g., a buffer larger than the target resolution by a multiple), and the multi-sampling buffer may be used to generate anti-aliased output at the target resolution. The area between the original path and the spread path may be anti-aliased to provide a smoother edge for the path.

In one embodiment, the region defined by the path may be split into one or more interior triangles and one or more exterior triangles. The interior triangles may share a constant alpha value and may be bypassed in the anti-aliasing process. The exterior triangles may be anti-aliased, and the vertices on the exterior triangles may be adjusted for the device pixel anti-alias spread as described above.

Figure 3:
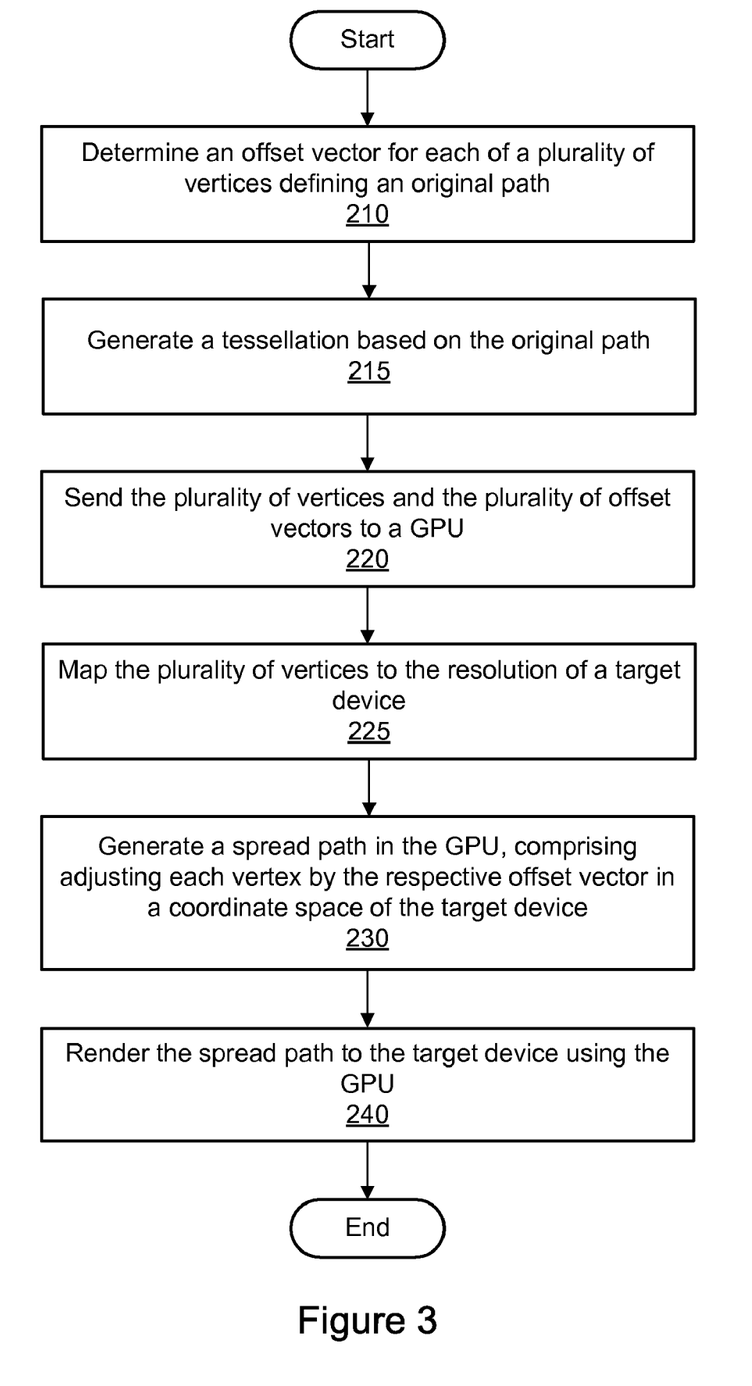
FIG. 3 is a flow diagram illustrating further aspects of a method for dynamic tessellation spreading according to one embodiment.

FIG. 3 is a flow diagram illustrating further aspects of a method for dynamic tessellation spreading according to one embodiment. Blocks 210, 220, 230, and 240 may comprise the same or similar operations as those described above with respect to FIG. 2. As shown in block 210, an offset vector may be determined for each of a plurality of vertices, wherein the plurality of vertices define an original path. As shown in block 215, a tessellation based on the original path may be generated. Conventional tessellation techniques may be used. When the path is tessellated to generate a plurality of triangles, the vertices of the triangles and their associated offset vectors may be stored together.

In one embodiment, the path may be normalized so that the resulting path has no self-intersections and produces monotonic sub-paths that are straightforward to tessellate. If the path is reduced to monotonic sub-paths, then the offsets may be computed in a direction that is consistent with the original shape of the combined sub-paths so that the resultant sub-paths do not overlap after the offsets have been added to the vertices. The tessellation of monotonic paths may be performed using conventional techniques. The resultant tessellation triangles with associated vertex offset vectors may be stored together in a vertex data structure suitable for transmission to the GPU 100. In one embodiment, the offset vectors may be stored as texture coordinates.

When the path includes curve segments, the curve segments may be reduced to monotonic curve segments (i.e., segments increasing or decreasing monotonically in the x and y dimensions). The monotonic curve segments may be processed in a manner similar to line segments described above. Additionally, to ensure that curve segments do not intersect, curves may be offset by adjusting the control points of the original curve. If the offset fit is not close enough, then the curve may be split into two curves and the fit re-tried. Because the offset is typically small (e.g., 1 to 2 pixels) and the curve segments are already monotonic, a good fit is typically expected with no splitting required.

As shown in block 220, the plurality of vertices and the plurality of offset vectors may be sent to the GPU as the tessellation. In other words, the triangles in the tessellated path plus the associated offset vectors may then be sent to the GPU. The offset vectors may be sent to the GPU as texture parameters.

As shown in block 225, the plurality of vertices may be mapped to a resolution of the target device prior to generating the spread path in the GPU. In one embodiment, the vertex shader 121 may map the triangle vertices to the resolution of the target device 190 (i.e., the target resolution). After the vertices have been mapped to device space, the vertex shader 121 may add the offset vectors to the triangle vertices in the device coordinate space for the target device 190. In one embodiment, adding the offset vector may result in each vertex being offset by a predetermined distance. For example, the predetermined distance may be 1 device pixel. In one embodiment, the predetermined distance may be a global value used for all vertices in a plurality of tessellated paths. The predetermined distance may be configurable. In one embodiment, the spread of the path may be further adjusted by suitably scaling the offset vector. As shown in block 230, a spread path may be generated in the GPU 100. As shown in block 240, the spread path may be rendered to the target device using the GPU 100.

Figure 4:
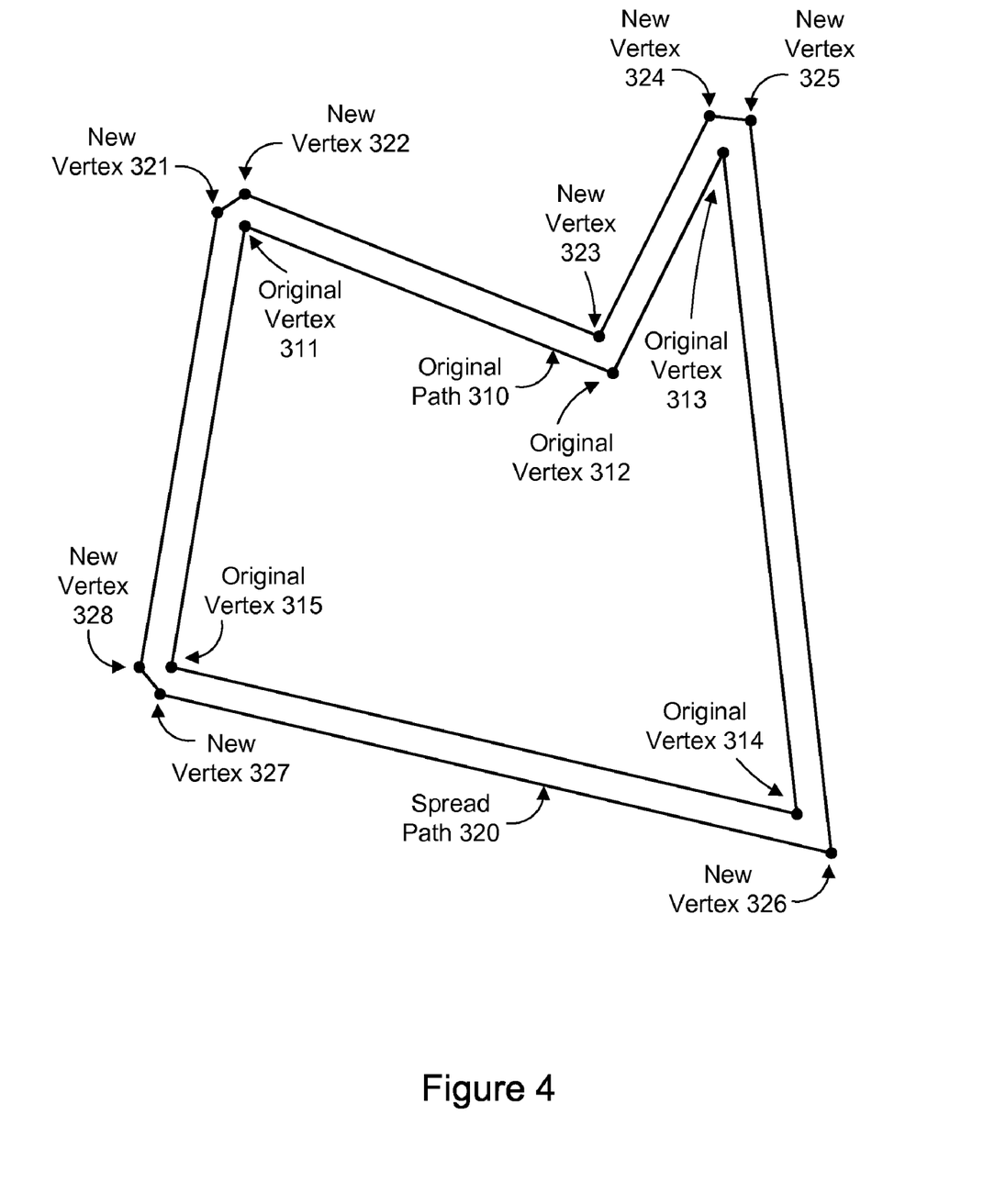
FIG. 4 is a block diagram illustrating the dynamic spreading of a path according to one embodiment.

Upon redisplaying the path to a new target resolution (e.g., after a zoom), the same tessellation may be used with offset vectors newly calculated in the GPU. Therefore, the expense of re-tessellating the path on the CPU may be avoided. In one embodiment, the expense of re-sending the tessellation to the GPU 100 may also be avoided. FIGS. 3 and 4 illustrate the same original path with two sets of offset vectors.

In another embodiment, the offset vector may be adjusted on the host system 180, and the adjusted vertex data may be sent to the GPU 100. In this case, the offset vector may be scaled by 1/(resolution scale) so that the correct adjustment results after the vertex is transformed to device space in the vertex shader program 121 or where this transformation is applied. In this embodiment, the triangles in the tessellation may be sent again from the host system 180 to the GPU 100 as required for redisplay. However, re-tessellation may be avoided.

FIG. 4 is a block diagram illustrating the dynamic spreading of a path according to one embodiment. In the example shown in FIG. 4, an original path 310 comprises original vertices 311, 312, 313, 314, and 315. Using the techniques described herein for dynamic tessellation spreading, a spread path 320 may be generated by applying offset vectors to the original vertices to create new vertices. For example, the original vertices 312 and 314 may be offset to create new vertices 323 and 326, respectively.

Additionally, new vertices may be created under particular conditions. For example, original vertex 311 may be split into new vertices 321 and 322, original vertex 313 may be split into new vertices 324 and 325, and original vertex 315 may be split into new vertices 327 and 328. The new line segments (e.g., between new vertices 321 and 322) are similar to the miters on stroked paths. When the path is spread, a miter may be introduced at vertices where the angle subtended at the vertex is below a threshold value. Typically, the threshold value may be selected to keep the distance of the spread path from the vertex to less than a suitable value or range of values (e.g., 1 to 2 pixels). At these points, the original vertex may be "split" into two vertices. The two new vertices may have the same coordinates but different offset directions. The two new vertices may also have an order which corresponds to the their order in the spread path. The preceding vertex in the original path may be connected to the first split vertex, and the succeeding vertex in the original path may be connected to the second split vertex. The two split vertices may be connected to each other.

Figure 5:
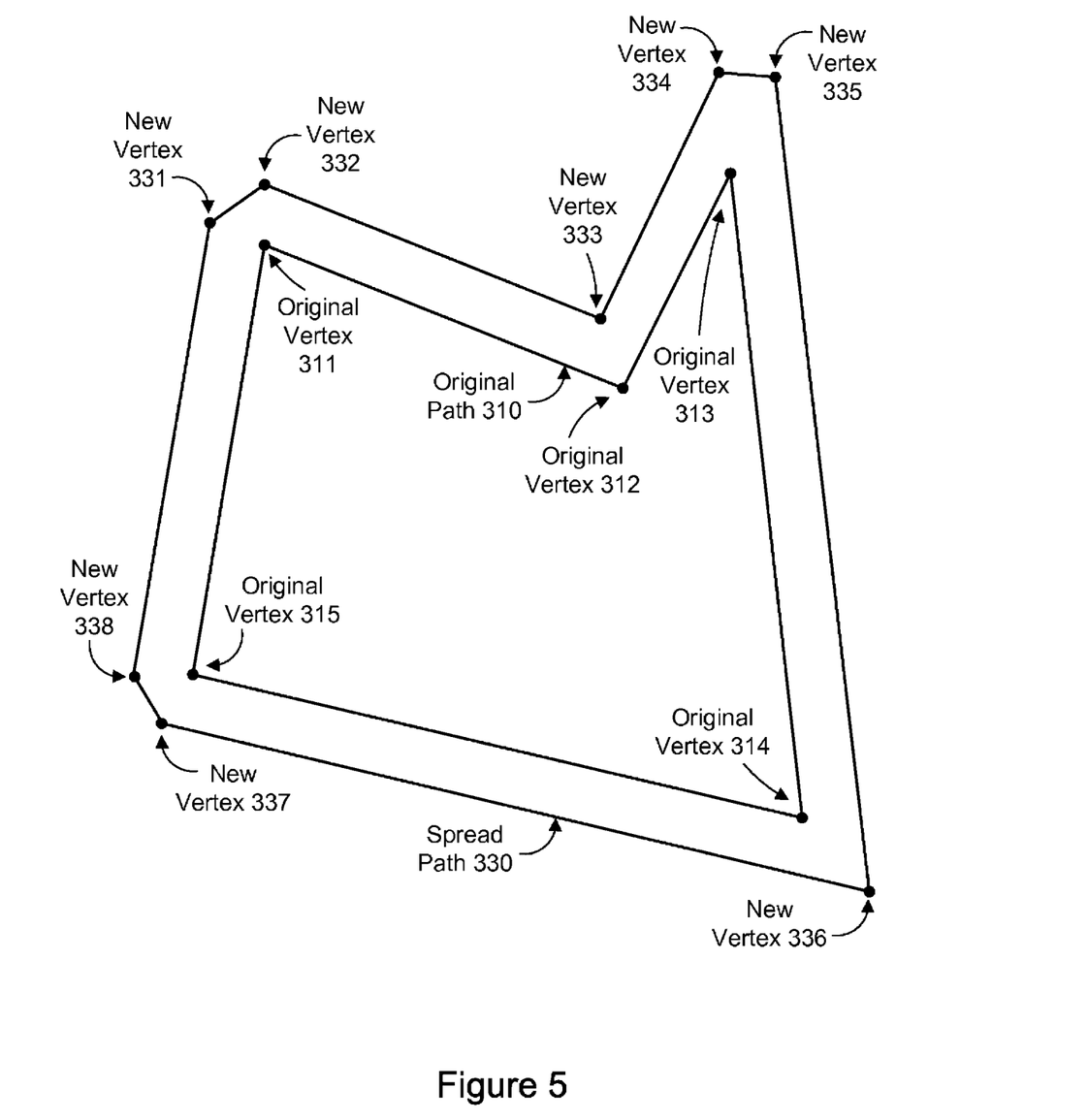
FIG. 5 is a block diagram further illustrating the dynamic spreading of a path according to one embodiment.

FIG. 5 is a block diagram further illustrating the dynamic spreading of a path according to one embodiment. The example shown in FIG. 5, another spread path 330 may be generated by applying new offset vectors to the original vertices of the original path 310. New vertices 331, 332, 333, 334, 335, 336, 337, and 338 may be generated in the same manner as described above with respect to FIG. 4. Spread path 330 may be generated, for example, after zooming out from a scene that includes the original path 310 and spread path 320 shown in FIG. 4. After the original vertices have been mapped to device space, the vertex shader 121 may add newly calculated offset vectors to the vertices in the device coordinate space for the target device 190. Because the region within the original path 310 is smaller in terms of target device pixels in FIG. 5 than in FIG. 4, the spread area (i.e., the area between the original path 310 and the spread path 330) in FIG. 5 is larger with respect to the region within the original path 310 than the spread area shown in FIG. 4. In terms of device pixels, however, the spread area in the zoomed-out scene in FIG. 5 may be similar in size to the spread area in FIG. 4. As discussed above, the same tessellation may be used in FIG. 5 as in FIG. 4. Therefore, the expenses of re-tessellating the path on the CPU and re-sending the tessellation to the GPU 100 may also be avoided.

Figure 6:
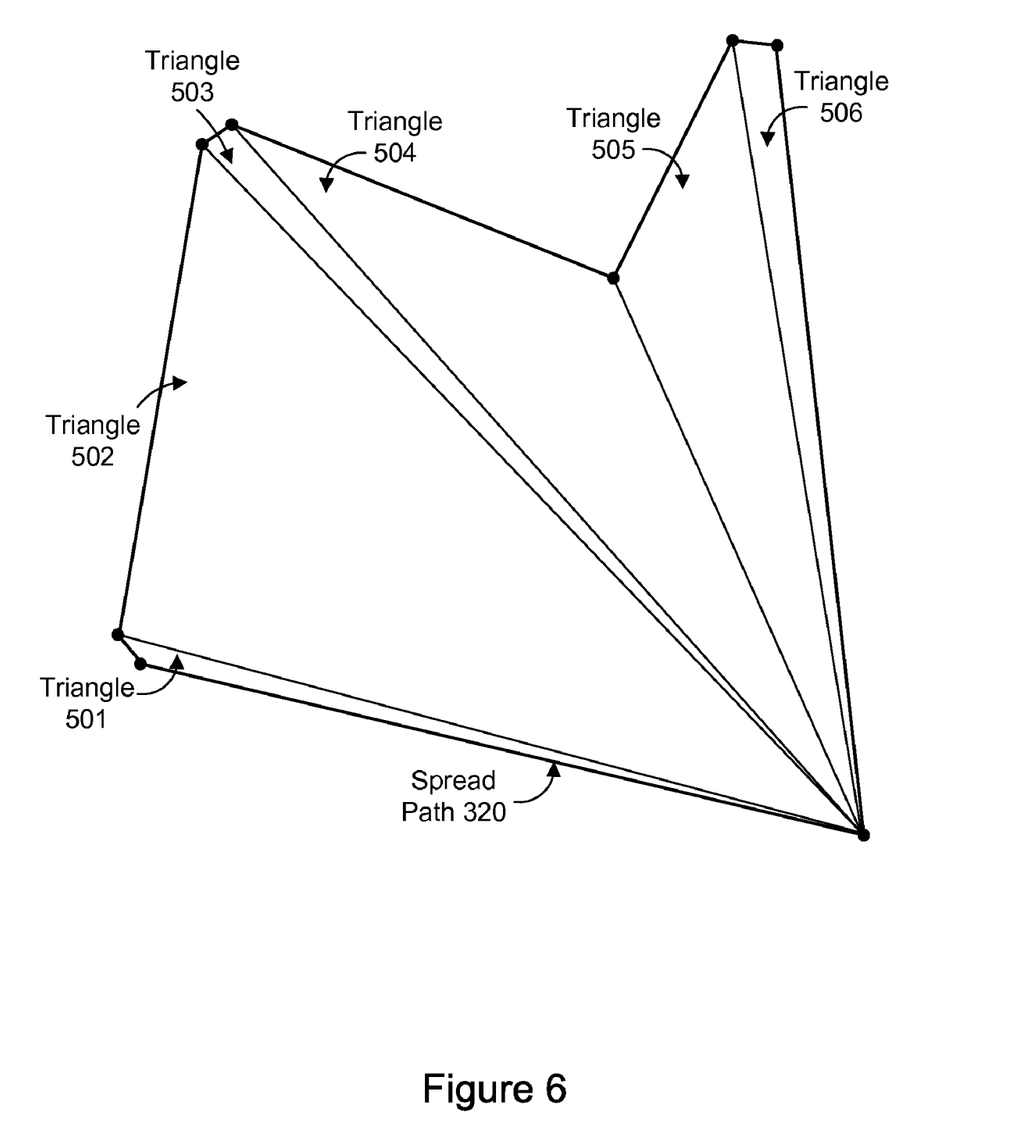
FIG. 6 is a block diagram illustrating the tessellated form of a dynamically spread path according to one embodiment.

FIG. 6 is a block diagram illustrating the tessellated form of a dynamically spread path according to one embodiment. An example tessellation based on spread path 320, with original vertices offset and three original vertices "split," includes six triangles 501, 502, 503, 504, 505, and 506. Due to the splitting of three vertices as discussed with respect to FIG. 4, three additional triangles 501, 503, and 506 are included in the tessellation relative to a tessellation of the original path 310. The ordering of the split vertices may determine that the resulting tessellation is still valid. Before the split vertices are moved to their offset position, the new triangles 501, 503, and 506 may be zero-area triangles. Therefore, the triangles 501, 503, and 506 may be redundant but still present in the tessellation.

In one embodiment, an edge that connects two vertices that are both split may be replaced as a result of the split with three connecting edges forming a "Z." For example, if vertex $v_1$ is split into $v_{1-1}$ and $v_{1-2}$, and if vertex $v_2$ is split into $v_{2-1}$ and $v_{2-2}$, then the original connecting edge between $v_1$ and $v_2$ may be replaced by an edge between $v_{1-1}$ and $v_{2-1}$, an edge between $v_{1-2}$ and $v_{2-2}$, and an edge between $v_{1-1}$ and $v_{2-2}$. The connection may be made such that the edge between $v_{1-1}$ and $v_{2-1}$ and the edge between $v_{1-2}$ and $v_{2-2}$ do not intersect. Alternatively, an edge between $v_{1-2}$ and $v_{2-1}$ may be used instead of the edge between $v_{1-1}$ and $v_{2-2}$. This tessellation edge assignment may be done on the CPU. Before the offset spread is applied, the triangles introduced by the above edges may also be zero-area triangles.

Similarly, non-zero triangles may be created from zero-width triangles located along the boundary of a polygon with dynamically offset edges. In this case, the original vertices may not be moved. Instead, additional coincident vertices may be added to create a strip which is dynamically expanded out along the boundary of the polygon. For example, each of the quadrilaterals in the spread area may be divided into two triangles where the outer points of the resulting triangles are coincident with the points on the path. The new triangles may then be dynamically formed by adding the offset to these outer vertices, thus dynamically creating the a suitable sized spread region.

In one embodiment, the techniques discussed above for dynamically spreading a tessellation may simulate overscan rendering on the GPU. With overscan simulation on a center scan rendering device, thin element dropout may be minimized or eliminated (e.g., at low resolutions).

FIG. 7 is a block diagram illustrating constituent elements of a computer system 900 that is configured to implement embodiments of the system and method for dynamic tessellation spreading. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows® from Microsoft Corporation, MacOS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a GPU such as the GPU 100 illustrated in FIG. 1. Additionally, the computer system 900 may include one or more imaging devices 952. The one or more imaging devices 952 may include various types of raster-based imaging devices such as monitors and printers. In one embodiment, one or more display devices 952 may be coupled to the graphics component 956 for display of data provided by the graphics component 956.

In one embodiment, program instructions 940 that may be executable by the processor(s) 910 to implement aspects of the dynamic tessellation spreading techniques described herein may be partly or fully resident within the memory 920 at the computer system 900 at any point in time. The memory 920 may be implemented using any appropriate medium such as any of various types of ROM or RAM (e.g., DRAM, SDRAM, RDRAM, SRAM, etc.), or combinations thereof. The program instructions may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. It will be apparent to those having ordinary skill in the art that computer system 900 can also include numerous elements not shown in FIG. 7, as illustrated by the ellipsis shown.

In various embodiments, the elements shown in FIGS. 2 and 3 may be performed in a different order than the illustrated order. In FIGS. 2 and 3, any of the operations described in the elements may be performed programmatically (i.e., by a computer according to a computer program). In FIGS. 2 and 3, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
   determining an offset vector for each of a plurality of vertices, wherein the plurality of vertices define an original path;
   sending the plurality of vertices and the plurality of offset vectors to a graphics processing unit (GPU);
   generating a spread path in the GPU, wherein generating the spread path comprises adjusting each vertex by the respective offset vector in a coordinate space of a target device; and
   rendering the spread path to the target device using the GPU, wherein rendering the spread path to the target device using the GPU comprises anti-aliasing an area between the original path and the spread path.

2. The method as recited in claim 1, wherein adjusting each vertex by the respective offset vector in the coordinate space of the target device comprises expanding the original path by a fixed distance in pixels of the target device.

3. The method as recited in claim 1, further comprising:
   generating a tessellation based on the original path after determining the offset vector for each of the plurality of vertices, wherein sending the plurality of vertices and the plurality of offset vectors to the GPU comprises sending the tessellation to the GPU; and generating another spread path in the GPU using the tessellation.

4. The method as recited in claim 1, further comprising:

mapping the plurality of vertices to a resolution of the target device prior to generating the spread path in the GPU.

5. The method as recited in claim 1, wherein generating the spread path in the GPU comprises adjusting the offset vectors relative to a resolution of the target device.

6. The method as recited in claim 1, wherein sending the plurality of vertices and the plurality of offset vectors to the GPU comprises sending each of the plurality of offset vectors as a texture parameter associated with the respective vertex.

7. The method as recited in claim 1, further comprising:

normalizing the plurality of offset vectors; and storing the plurality of offset vectors as unit directional vectors.

8. A non-transitory, computer-readable storage medium, comprising program instructions, wherein the program instructions are computer-executable to implement:

determining an offset vector for each of a plurality of vertices, wherein the plurality of vertices define an original path;

sending the plurality of vertices and the plurality of offset vectors to a graphics processing unit (GPU), wherein sending the plurality of vertices and the plurality of offset vectors to the GPU comprises sending each of the plurality of offset vectors as a texture parameter associated with the respective vertex;

generating a spread path in the GPU, wherein generating the spread path comprises adjusting each vertex by the respective offset vector in a coordinate space of a target device; and rendering the spread path to the target device using the GPU.

9. The non-transitory, computer-readable storage medium as recited in claim 8, wherein adjusting each vertex by the respective offset vector in the coordinate space of the target device comprises expanding the original path by a fixed distance in pixels of the target device.

10. The non-transitory, computer-readable storage medium as recited in claim 8, wherein the program instructions are further computer-executable to implement:

generating a tessellation based on the original path after determining the offset vector for each of the plurality of vertices, wherein sending the plurality of vertices and the plurality of offset vectors to the GPU comprises sending the tessellation to the GPU; and generating another spread path in the GPU using the tessellation.

11. The non-transitory, computer-readable storage medium as recited in claim 8, wherein the program instructions are further computer-executable to implement:

mapping the plurality of vertices to a resolution of the target device prior to generating the spread path in the GPU.

12. The non-transitory, computer-readable storage medium as recited in claim 8, wherein generating the spread path in the GPU comprises adjusting the offset vectors relative to a resolution of the target device.

13. The non-transitory, computer-readable storage medium as recited in claim 8, wherein rendering the spread path to the target device using the GPU comprises anti-aliasing an area between the original path and the spread path.

14. The non-transitory, computer-readable storage medium as recited in claim 8, wherein the program instructions are further computer-executable to implement:

normalizing the plurality of offset vectors; and storing the plurality of offset vectors as unit directional vectors.

15. A system, comprising:

at least one processor;

a memory coupled to the at least one processor, wherein the memory is configured to store program instructions executable by the at least one processor to determine an offset vector for each of a plurality of vertices, wherein the plurality of vertices define an original path;

an imaging device; and a graphics processing unit (GPU) coupled to the at least one processor and the imaging device, wherein the GPU is executable to:

receive the plurality of vertices and the plurality of offset vectors from the at least one processor;

generate a spread path, wherein generating the spread path comprises adjusting each vertex by the respective offset vector in a coordinate space of the imaging device, and wherein generating the spread path comprises adjusting the offset vectors relative to a resolution of the imaging device; and render the spread path to the imaging device.

16. The system as recited in claim 15, wherein, in adjusting each vertex by the respective offset vector in a coordinate space of the imaging device, the GPU is executable to expand the original path by a fixed distance in pixels of the imaging device.

17. The system as recited in claim 15, wherein the program instructions are executable by the at least one processor to generate a tessellation based on the original path after determining the offset vector for each of the plurality of vertices;

wherein, in receiving the plurality of vertices and the plurality of offset vectors from the at least one processor, the GPU is executable to receive the tessellation; and wherein the GPU is executable to generate another spread path using the tessellation.

18. The system as recited in claim 15, wherein the GPU is executable to:

map the plurality of vertices to a resolution of the imaging device prior to generating the spread path.

19. The system as recited in claim 15, wherein, in rendering the spread path to the imaging device, the GPU is executable to anti-alias an area between the original path and the spread path.

20. The system as recited in claim 15, wherein, in receiving the plurality of vertices and the plurality of offset vectors from the at least one processor, the GPU is executable to receive each of the plurality of offset vectors as a texture parameter associated with the respective vertex.

21. The system as recited in claim 15, wherein the offset vectors comprise unit directional vectors.

22. The system as recited in claim 15, wherein the GPU comprises a vertex shader, wherein the offset vectors are stored as texture coordinates, and wherein, in generating the spread path, the GPU is executable to add each of the plurality of offset vectors to coordinates of the respective vertex.

* * * * *